(12) United States Patent
Jefferies et al.

(10) Patent No.: US 12,132,729 B2
(45) Date of Patent: Oct. 29, 2024

(54) MANAGEMENT OF SETTING CHANGE PROPAGATION IN NETWORKED DEVICES

(71) Applicant: Schneider Electric USA, Inc., Andover, MA (US)

(72) Inventors: Kevin M. Jefferies, Raleigh, NC (US); Matthew L. White, Cary, NC (US); Richard K. Weiler, Wake Forest, NC (US); Alan E. Freeman, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 17/037,145

(22) Filed: Sep. 29, 2020

(65) Prior Publication Data
US 2022/0103549 A1 Mar. 31, 2022

(51) Int. Cl.
*H04L 41/0813* (2022.01)
*G06Q 10/20* (2023.01)
*H04L 9/40* (2022.01)
*H04L 41/08* (2022.01)
*G06Q 30/018* (2023.01)

(52) U.S. Cl.
CPC ...... *H04L 63/0876* (2013.01); *H04L 41/0813* (2013.01); *H04L 41/0886* (2013.01); *H04L 63/166* (2013.01); *G06Q 10/20* (2013.01); *G06Q 30/0185* (2013.01)

(58) Field of Classification Search
CPC ............ H04L 63/0876; H04L 41/0813; H04L 41/0886; H04L 63/166; G06Q 10/20; G06Q 30/0185
See application file for complete search history.

(56) References Cited

U.S. PATENT DOCUMENTS

| 7,574,417 | B1* | 8/2009 | McGreevy | G05B 19/408 700/109 |
| 9,648,012 | B1* | 5/2017 | Machani | H04L 9/3218 |
| 2008/0059953 | A1* | 3/2008 | Savva | G06F 9/44505 717/121 |
| 2009/0190738 | A1* | 7/2009 | Guedalia | H04L 67/54 379/211.02 |
| 2011/0093710 | A1* | 4/2011 | Galvin | H04L 63/061 713/169 |

(Continued)

OTHER PUBLICATIONS

Extended European Search Report for European Patent Application No. 21198915.7, dated Jan. 28, 2021.

(Continued)

*Primary Examiner* — Chris Parry
*Assistant Examiner* — Steven C Nguyen
(74) *Attorney, Agent, or Firm* — Locke Lord LLP

(57) ABSTRACT

A computer-implemented method is provided to automatically adjust a device setting of a plurality of networked devices. The method includes performing autonomously at a device of the plurality of networked devices, receiving a request to update a device setting to a new value, comparing a characteristic of the plurality of networked devices to a corresponding characteristic of the device, determining one or more similar devices of the plurality of devices that satisfy a similarity criteria based on a result of the comparison, and accessing the one or more similar devices to change the device setting of the one or more similar devices to the new value.

17 Claims, 4 Drawing Sheets

(56) References Cited

U.S. PATENT DOCUMENTS

| | | | |
|---|---|---|---|
| 2012/0224711 A1* | 9/2012 | Kim | H04W 4/023 709/204 |
| 2012/0284786 A1* | 11/2012 | Somani | H04L 63/0884 726/5 |
| 2013/0167209 A1* | 6/2013 | McBride | G06F 21/41 726/6 |
| 2014/0259005 A1* | 9/2014 | Jeffrey | G06F 8/65 717/173 |
| 2015/0089619 A1 | 3/2015 | Manza et al. | |
| 2016/0042278 A1* | 2/2016 | Baughman | H04L 67/568 706/52 |
| 2017/0192414 A1* | 7/2017 | Mukkamala | G06F 3/04842 |
| 2018/0260093 A1* | 9/2018 | Barsness | G06F 3/0488 |
| 2019/0273729 A1* | 9/2019 | Adler | H04W 84/18 |
| 2019/0306225 A1* | 10/2019 | Burton | H04L 43/0876 |
| 2020/0064797 A1* | 2/2020 | Hannon | H04L 67/34 |
| 2020/0119979 A1* | 4/2020 | Woodland | H04L 67/34 |
| 2021/0091971 A1* | 3/2021 | Keohane | H04L 12/2829 |
| 2021/0251019 A1* | 8/2021 | Sayed | H04L 41/0806 |
| 2021/0368024 A1* | 11/2021 | Shah | G06F 8/61 |

OTHER PUBLICATIONS

Dinh Ngoc-Tbanh et al: "Auto-Configuration in Wireless Sensor Networks: A Review", Sensors, vol. 19, No. 19, Oct. 2, 2019 (Oct. 2, 2019), pp. 1-24, XP055880356, DOI: 10.3390/819194281, see in particular sections "4.2.3. A Simple Upgrade Method" and "3.2.2. Multi-Tiers Configuration".

Kerrie Meyler et al: "System Center Operations Manager 2007 Unleashed", Feb. 29, 2008 (Feb. 29, 2008), Sams Publishing, XP055466924, ISBN: 978-0-672-32955-5 vol. 4, pp. ToC, 54-58,105-108, 129, 170-172, 208, 239-242, 245-248, 345-349, 418-420, 739-741, 860, p. 55-pp. 56, 170 pp. 241,247-p. 248.

\* cited by examiner

MANAGEMENT OF SETTING CHANGE PROPAGATION IN NETWORKED DEVICES

TECHNICAL FIELD

The present disclosure relates to networked devices, and more particularly, to management of setting change propagation in networked devices.

BACKGROUND

A network of devices can include a large number of devices. For example, in an industrial setting, hundreds or thousands of automated devices may operate in coordination to perform industrial tasks. Examples of industrial tasks can include, for example, manufacturing or testing tasks. A single network can include many different types of automated devices. Manual management of the devices as individual devices can be time consuming and cumbersome. Centralized management adds complexity and may encounter compatibility issues due to the different types of networked devices, e.g., manufactured by different manufacturers that may have different architectures and/or use different applications.

Examples of management issues that can arise include, for example, changing of device settings. One device setting that needs management is removal of user credentials for a particular user to all of the devices, such as when an employee has lost rights of access to the devices, or user password changes. Another device setting that needs management can include updates to software, such application and security updates. An increase in frequency of passwords changes, frequency of application or security updates, and the number of devices in a network can lead to an increase in the cumbersomeness and complexity of managing the networked devices. The heterogeneous types of networked devices, each with different management needs can add a further layer of complexity.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method to automatically adjust a device setting. The method includes receiving, at a device of a plurality of networked devices, a request to update a device setting to a new value, comparing, autonomously by the device, a characteristic of the plurality of networked devices to a corresponding characteristic of the device, determining, autonomously by the device, one or more similar devices of the plurality of devices that satisfy a similarity criteria based on a result of the comparison, and accessing, autonomously by the device, the one or more similar devices to change the device setting of the one or more similar devices to the new value.

In one or more embodiments, the method can further include selecting, autonomously by the device, at least one device of the one or more similar devices that has its device setting set to an expected value, wherein the device autonomously changes the device setting of only the at least one selected device.

In one or more embodiments, the request can further request to update the device setting from an original value, and the expected value can be the original value.

In one or more embodiments, the device setting can be at least one of a user credential, a system setting for the device, and an application setting for an application executable by the first device.

In one or more embodiments, the accessing autonomously by the device each of the one or more similar devices can include at least one of one-way authentication of the device by the one or more similar devices or two-way authentication between the device and the one or more similar devices.

In one or more embodiments, the characteristic can be represented in a field stored by the plurality of networked devices.

In one or more embodiments, comparing autonomously by the device can include determining a probability of similarity between the characteristic of the plurality of networked devices and the corresponding characteristic of the device.

In one or more embodiments, the method can further include storing, by the device, a similarity matrix that includes a probability of similarity score for at least a portion of the respective plurality of networked devices and determines the probability of similarity from the similarity matrix.

In one or more embodiments, the device can communicate with the other devices of the plurality of networked devices using transport layer security (TLS) or secure webpages.

In one or more embodiments, the new value can be different for respective devices of the one or more similar devices.

In one or more embodiments, the new value can vary for respective devices of the one or more similar devices in accordance with a predetermined equation.

In accordance with another aspect of the disclosure, disclosed is a device. The device includes a memory configured to store a plurality of programmable instructions and at least one processing device in communication with the memory. The at least one processing device, upon execution of the plurality of programmable instructions, is configured to receive a request to update a device setting of the device to a new value, autonomously compare a characteristic of a plurality of networked devices to a corresponding characteristic of the device, autonomously determine one or more similar devices of the plurality of devices that satisfy a similarity criteria based on a result of the comparison, and access, autonomously by the device, the one or more similar devices to change the device setting of the one or more similar devices to the new value.

In one or more embodiments the processor, upon execution of the plurality of programmable instructions can further be configured to select, autonomously by the device, at least one device of the one or more similar devices that has its device setting set to an expected value, wherein the device can autonomously change the device setting of only the at least one selected device.

In one or more embodiments, autonomously comparing the characteristic can include determining a probability of similarity between the characteristic of the plurality of networked devices and the corresponding characteristic of the device.

In one or more embodiments wherein the device can store a similarity matrix that includes a probability of similarity score for at least a portion of the respective plurality of networked devices and can determine the probability of similarity from the similarity matrix.

In one or more embodiments the new value can be different for respective devices of the at least one selected device.

A further aspect of the disclosure provides a non-transitory computer readable storage medium having one or more computer programs embedded therein, which when executed by a computer system, cause the computer system to receive a request to update a device setting of a device of a plurality of networked devices to a new value, autonomously compare a characteristic of the plurality of networked devices to a corresponding characteristic of the device, autonomously determine one or more similar devices of the plurality of devices that satisfy a similarity criteria based on a result of the comparison, and autonomously access the one or more similar devices to change the device setting of the one or more similar devices to the new value. In one or more embodiments, the instructions, when executed by a computer system, can further cause the computer system to autonomously select at least one device of the one or more similar devices that has its device setting set to an expected value, wherein the device can autonomously change the device setting of only the at least one selected device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to networked devices. An individual device of the networked device can receive a request to update a device setting of the device to a new value. The device autonomously compares a characteristic of the other networked devices to a corresponding characteristic of the device and determines one or more similar devices of the networked devices that satisfy a similarity criteria based on a result of the comparison. The device autonomously accesses the at least one selected device to change the device setting of the at least one selected device to the new value. In this way, a device that receives the request to update the device setting can propagate the same change to other similar devices. In one or more embodiments, each of the networked devices has the capability of propagating a request to update its device setting to similar devices with which it is networked.

In one example scenario, a networked device can receive a request to change the password of a particular user. The device can propagate the change to similar devices of the network, such as to all networked devices that are configured for the particular user, or only networked devices having a particular manufacturer, model, or that are assigned to a particular group. Devices can be selected from the similar devices, such as those networked devices that have an expected password for the particular user, wherein the expected password can be same password as provided by the request or as originally set for the device that received the request. The device that received the request can propagate the password change to all of the selected devices, or alternatively the change can be suggested to a user and implemented when the suggestion is accepted.

Figure 1:
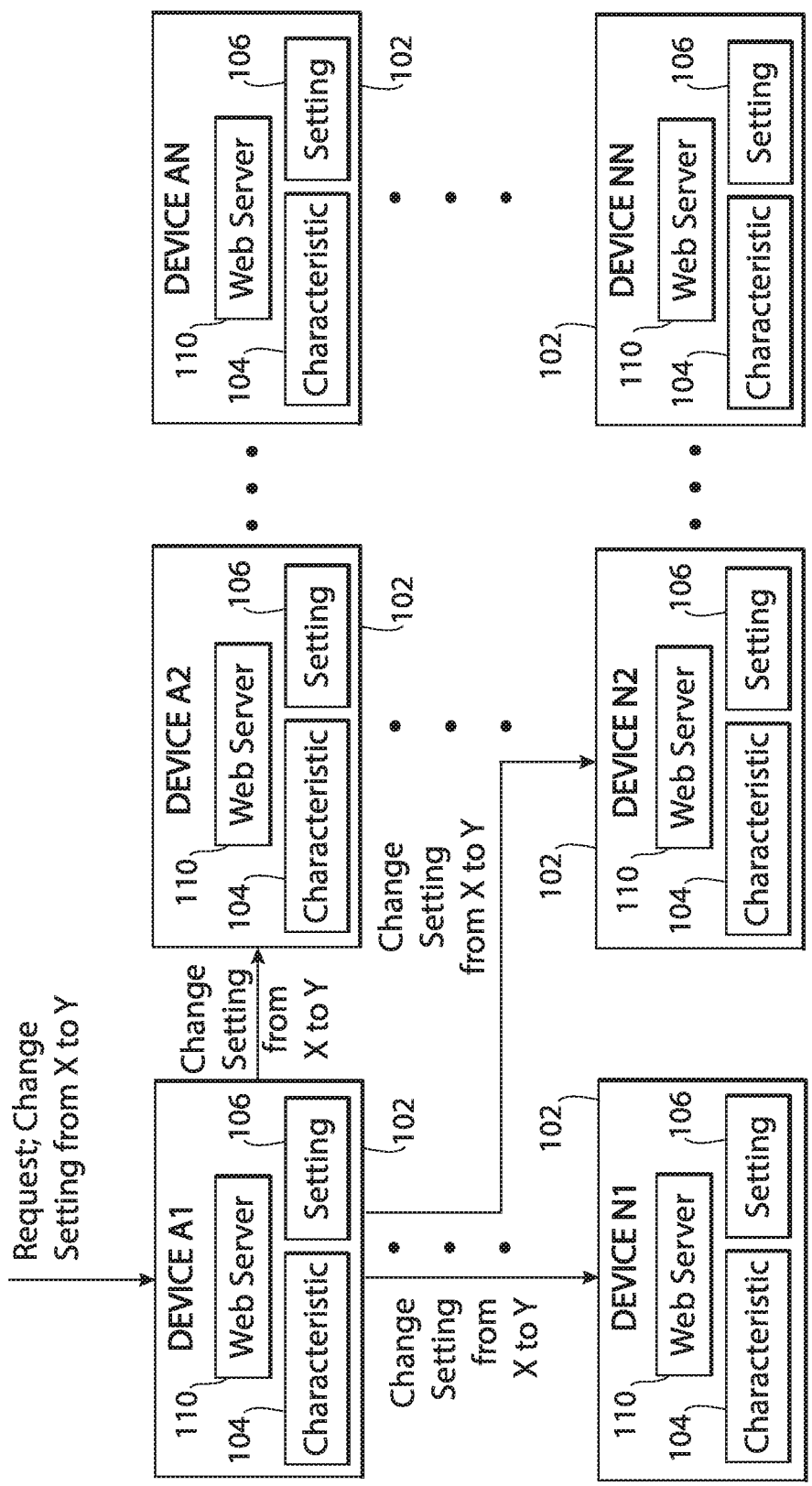
FIG. 1 is a block diagram illustrating a plurality of example networked devices configured to propagate a requested setting change to one of the networked devices, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a network of devices in accordance with the disclosure is shown in FIG. 1 and is designated generally by reference character 100. Other embodiments of the network of devices 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a memory storage device or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

FIG. 1 further shows a plurality of networked devices 102 that are configured to communicate with one another and to store and process information. Networked devices 102 can be, for example and without limitation, embedded devices, smart devices (mobile or stationary) or, computers (e.g., servers or laptop or desktop computers). The networked devices 102 can include different types of devices that serve different purposes, also referred to as heterogeneous devices. Each networked device 102 stores characteristics data 104 that defines the type of the networked device 102. In an example application, networked devices 102 are a variety of different types of industrial control devices, such as motor controllers, motion controllers, machine drives, and/or switches. The characteristic data 104 can include, for example, identification of the networked device's manufacturer and model. In one or more embodiments, the characteristic data 104 can include user settings, such as identification of a group to which the networked device 102 belongs or a site at which the networked device 102 is located.

Each networked device 102 further includes one or more device settings 106. The device settings 106 can include, for example without limitation, usernames of users authorized to logon to the networked device 102, password, physical settings (e.g., thresholds (for computed or measured data) that trigger an action, characteristic (e.g., speed, magnitude, amplitude, content) of an output.

The networked devices 102 can be networked via wired and/or wireless connections, which can include (without limitation) Ethernet, Wi-Fi, Bluetooth, radio frequency identification (RFID), etc. In the example shown, networked devices 102 are shown as an array of devices A1-AN, B1-BN, . . . N1-NN, however network devices 102 can be networked in any configuration (ring, mesh, etc.).

At least a portion of the networked devices 102 includes an interface (as shown in FIG. 5) for receiving a request. The interface can be coupled with an external processing device for receiving requests from the processing device or can be coupled with a user input and/or output device (e.g., keypad, touchscreen, etc.) and utilize a user interface (shown in FIG. 5) for receiving requests from a user. The user interface can support a textual or graphical user interface (GUI). The request can be submitted by a user or the external processing device to change a specified setting of the device settings 106 to a new value Y. In one or more embodiments, the request can specify an original value of the specified setting being changed. Upon receiving a request, a networked device 102 changes its device settings 106 as specified by the request.

As shown in FIG. 1, networked device 102 (A1) (also referred to as requested networked device 102) receives a request to change a setting of its device settings 106 to a new value Y or from an original value X to the new value Y. Although the example refers to networked device 102 (A1) as receiving the request, any of the other networked devices 102 (A2)-(NN) can be the requested networked device 102 that receives the request and performs the functions described below with respect to networked device 102 (A1).

Networked device (A1) 102 autonomously compares its own characteristic data 104 to corresponding characteristic data 104 of the other networked devices 102 in order to find similar networked devices 102. In the example shown, networked device 102 (A1) determines autonomously that comparison of the characteristic data 104 of networked device 102 (A1) to corresponding characteristic data 104 of networked devices 102 (A2), (N1), N2), and (NN) satisfy a similarity criteria and determines networked devices 102 (A2), (N1), (N2), and (NN) are similar devices. For example, the characteristic data 104 may represent information that identifies manufacturer, model, and group assignment of the networked device 102. In the example scenario, networked devices 102 (A2), (N1), (N2), and (NN) are determined to be similar devices because it was determined they have the same manufacturer and model and are assigned to the same group as networked device 102 (A1).

The autonomous comparison performed by networked device 102 (A1) can include discovering as needed and sending a query to each of the networked devices 102 for their characteristic data 104. The characteristic data 104 can be provided in a field stored by the respective networked devices 102. Upon receiving the characteristic data 104 from networked devices 102, networked device 102 (A1) compares its characteristic data 104 to the received characteristic data 104.

The networked devices 102 can discover one another and send and receive queries and responses using, for example and without limitation, devices profile for web services (DPWS), web services (WS)-Discovery, or secure shell (SSH). Furthermore, communication between the networked devices 102 can use transport layer security (TLS) to provide communications security over the network being used. Communication between the networked devices 102 can require authentication in either or both directions, such as can be provided by using embedded webpages or machine-to-machine mutual authentication.

Satisfaction of the similarity criteria by the networked device 102 can include determining a probability of similarity between one or more characteristics of the networked device 102 (A1) and one or more corresponding characteristics of the other networked devices 102 (A2)-(NN). The probability of similarity can be a function of an equation or logic based information already stored by the networked device 102 (A1) and/or information obtained from the other networked devices 102(A2)-(NN) in response to queries.

In one or more embodiments, the networked device 102 (A1) stores or accesses a similarity matrix that includes a probability of similarity score associated with at least a portion of the respective other networked devices 102 (A2)-(NN). The probability of similarity score associated, for example with networked device 102 (A2) represents the probability of similarity between networked device 102 (A1) and networked device 102 (A2). The networked device 102 (A1) uses the similarity matrix to determine network devices of the other networked devices 102 (A2)-(NN) that satisfy the similarity criteria. The similarity scores can be determined as a function of a comparison of corresponding characteristics learned by receiving responses to queries, such as device name (e.g., model), commercial reference (e.g., manufacturer), and structure or functional capabilities (e.g., size, range of available settings), etc.

Since each networked device 102 can be a requested networked device 102 that receives a request and performs the functions described for networked device 102 (A1), each of the networked devices 102 can have a similarity matrix that it stores or can access. The similarity matrix can be stored and maintained locally by the networked device 102, or can be stored and maintained externally and accessed by the networked device 102.

In one or more embodiments, the respective networked devices 102 can share their respective similarity matrices with external destinations, such as customers or a central management point (e.g., a central processing device that can manage the networked devices 102 for non-autonomous processes).

In an example scenario, the networked device 102 (A1) may be a motor associated with a conveyor system in an industrial setting having many other type of devices. The similar devices can be determined to be all of the networked devices 102 responsible for driving the conveyor system in a particular direction.

In one or more embodiments, the networked device 102 (A1) autonomously selects at least one networked device 102 from the similar devices that has at least one particular setting of its device setting 106 set to an expected value. In the example scenario provided in FIG. 1, networked devices 102 (N1), (N2), and (A2) are selected from the similar devices because they have a particular setting set to the expected value. Examples of device settings 106 includes a user credential (e.g., passwords, authorized user, constraints on authorized users), device system settings (e.g., an update to a simple network time protocol (SNTP) time server address or rapid spanning tree protocol (RSTP) parameters), and application settings (e.g., an updates to a motor protection undercurrent alarm threshold (such as from 80% to 70%), or an update to a motor protection ground current trip function from (such as from an enable setting to a disable setting).

The expected value may be, for example and without limitation, the original value X provided with the request, or may be the value set for networked device 102 (A1)'s setting. In one or more embodiments, the expected value is stored or determined by networked device 102 (A1).

Networked device 102 (A1) uses a communication protocol for accessing the setting of the similar values or queries the similar devices to determine the values set for the setting of the similar devices. The communication protocol can be, for example, MODBUS™ transmission control protocol (TCP), ethernet/internet protocol (IP), hypertext transfer protocol secure (HTTPS), PROFINET™, etc.

Networked device 102 (A1) (which is the requested networked device 102 in this example) then uses the communication protocol to autonomously access the device settings 106 of each target networked device 102. The targeted networked devices 102 are each of the similar devices or each of the selected networked devices 102, if a selection is made of devices having their device settings set to an expected value. The requested networked device 102 uses the communication protocol to change the requested setting of its device settings 106 to the new value Y. In one or more embodiments, the requested networked device 102 must logon to the target networked device 102 for which it is accessing for changing a setting of the device settings 106.

The device settings 106 of a target networked device 102 (which can be the similar or selected networked device 102) that are to be updated can be accessible by the requested networked device 102, for example, via ethernet fieldbus. However, before the requested networked device 102 can make an update, a process of authentication to gain exclusive control can be required to assure there are not multiple sources trying simultaneously to change the device settings 106 of the same target networked device 102. In one or more examples, the requested networked device 102 might read an attribute from device settings 106 of the target networked device 102 with a one-time passphrase and then write that passphrase back to the target networked device 102. In this way the requested networked device 102 gains exclusive control for a predetermined time interval (e.g., 60 seconds), during which the requested networked device 102 can update the device settings 106 of the target networked device 102. The described usage of the one-time passphrase can be referred to as a handshake.

Figure 2:
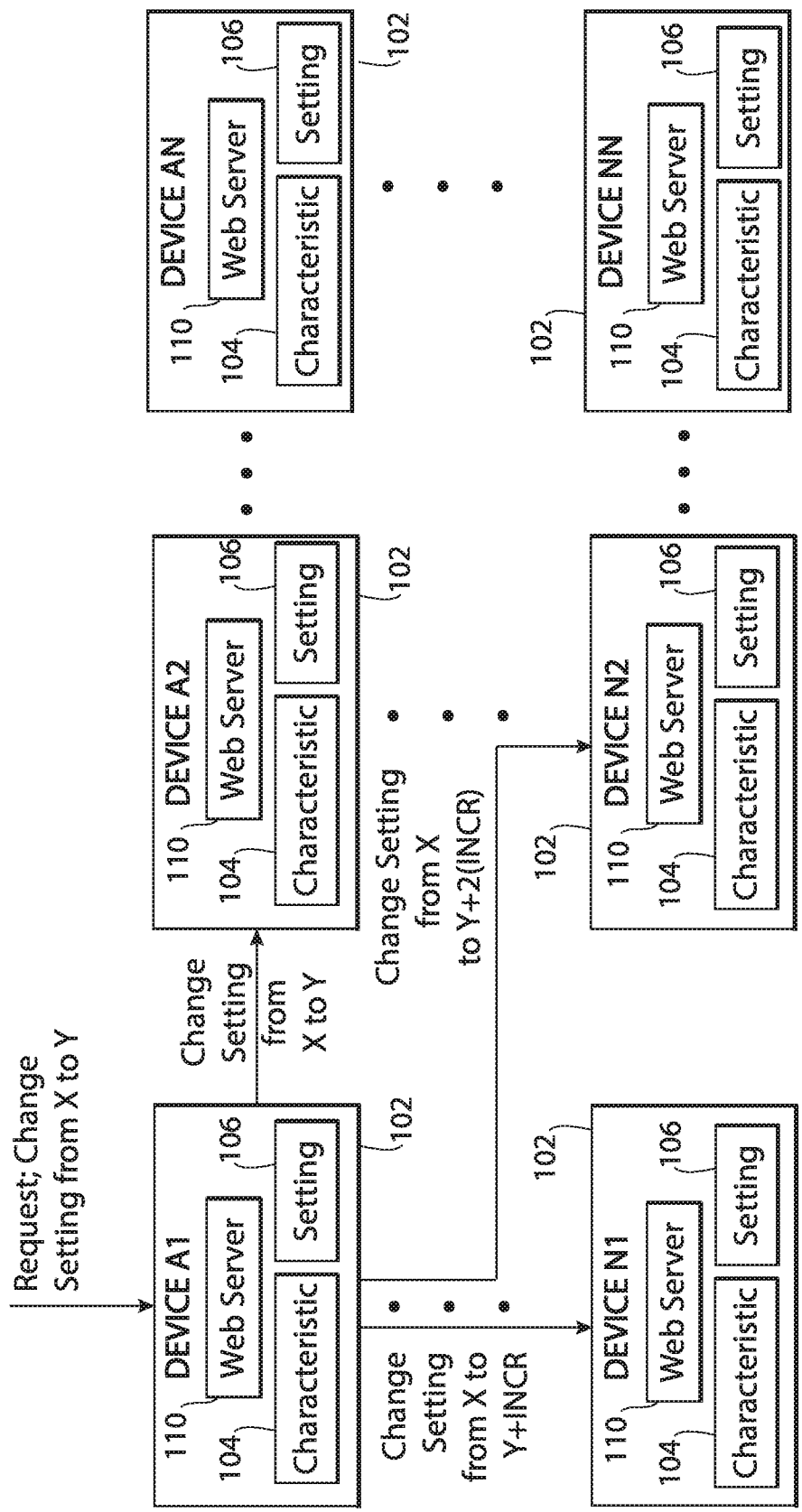
FIG. 2 is a block diagram illustrating a plurality of example networked devices configured to propagate a requested setting change to one of the networked devices with computed variations in the respective setting changes, in accordance with embodiments of the disclosure.

In one or more embodiments, the target networked device 102 can include a web server 110. The web server 110 can be included with the target networked device's 102 firmware and accessible to other networked devices 102. The device settings 106 of the target networked device 102 may be accessible only via the web server 110, such as via HTTPS with use of a username and password. Requested networked device 102 would need to log into the web server 110 of each target networked device 102 by using a pre-established username and password in order to access the target networked device 102. The web server would then change the device settings 106 of the target networked device(s) 102. Device settings 106 are adjusted only for the target networked devices 102 that the requested networked device 102 accessed by the logon process. With reference to FIG. 2, in one or more embodiments, when there is more than one targeted networked device 102, the new value Y can be different for the respective targeted networked devices 102. In one or more embodiments, the variation in the respective values can be based on a predetermined equation. For example and without limitation, the respective values can be incremented by an incremental value (INCR). The order in which the equation is applied to the respective targeted networked devices 102 is in accordance with predetermined rules and/or prioritization values assigned to the targeted networked devices 102. In the example shown, the setting of targeted networked devices 102 (A2), (N1), and (N2) are changed, respectively, from X to Y, from X to Y+INCR, and from X to Y+2(INCR).

As an example scenario in which staggering settings with a varying increment applied to the respective selected networked devices 102 may be useful, considering the scenario described above for motors driving a conveyor system, a staggered delay of changing settings to motors located at different downstream locations along a conveyor belt can allay potential power overload or mechanical interference.

In an example scenario, when networked device 102(A1) receives a request to change a setting, such as a change to a user credential, an application update, or a maintenance procedure, networked device 102(A1) can determine similar devices of the networked devices 102 for which a similar change should be made or should be suggested. Setting changes can be suggested or implemented for all or particular ones of the selected networked devices 102 (e.g., (A2), (N1), and (N2)). This guides coordination and provides consistency of settings across similar devices and provides consistency for human actions (e.g., maintenance operations or password changes).

Figure 4:
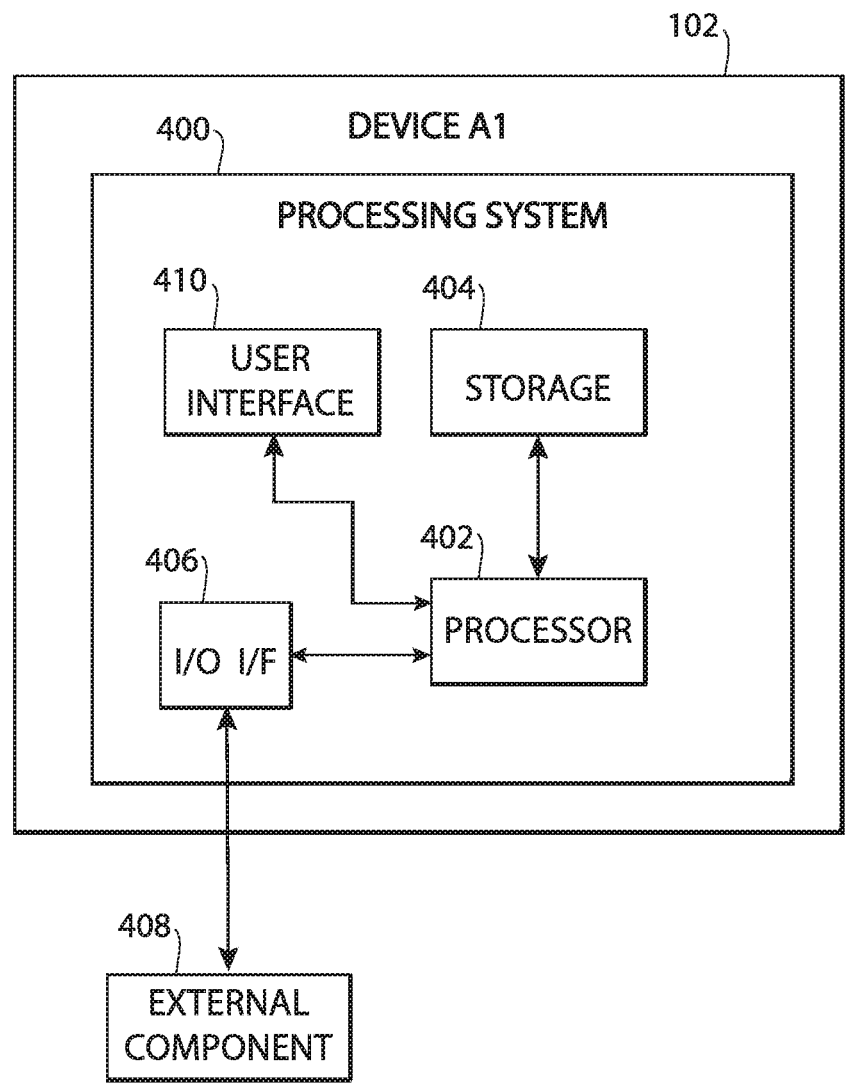
FIG. 4 is a block diagram of an exemplary computer system of a device of the networked devices of any of FIGS. 1-3 configured to implement propagation of the requested setting change.

A suggestion can be output (e.g., as a displayed as a GUI or textual interface) to the user output device (e.g., display device) associated with the networked device 102(A1) or any of the selected networked devices 102 (e.g., (A2), (N1), and (N2)) or to a user output device of the central management point (e.g., which can be provided as an external component 408 shown in FIG. 4).

The suggestion can be accepted via a user input device (e.g., touch screen or keypad) of the device that received the suggestion. A user of the networked device 102 (A1) or the central management point can accept or decline a suggestion displayed at its user output device for changing the setting of all or particular ones of the selected networked devices 102 (e.g., (A2), (N1), and (N2)). A user of any of the selected networked devices 102 (e.g., (A2), (N1), and (N2)) can accept or decline the suggestion displayed at its user output device for changing its own setting.

In one scenario, the request can be to change the password of a particular user. The similar devices can be all networked devices 102 that are configured for the particular user, or only networked devices 102 having a particular manufacturer, model, or are assigned to a particular group. The selected devices can be networked devices 102 that have an expected password for the particular user, wherein the expected password can be same password as provided by the request or as originally set for the networked device 102 (A1) that received the request. The password can be changed to a requested password for all of the selected devices, or alternatively the change can be suggested and implemented when the suggestion is accepted.

In another scenario, the request can be to delete a particular user from having authorization to log onto similar networked devices 102. The similar devices can be networked devices 102 that have a particular manufacturer, model, or are assigned to a particular group. The selected devices can be networked devices 102 that provide authorization to the particular user. The user can be removed for all of the selected devices, or alternatively the user removal can be suggested and implemented when the suggestion is accepted.

In one scenario, the request can be to change a particular setting of system settings. The similar devices can be all networked devices 102 that have a particular manufacturer, model, or are assigned to a particular group. The selected devices can be networked devices 102 for which the setting is set to an expected value at the time the request is received, wherein the setting value can be the same setting value for which the networked device 102 (A1) that received the request is configured or a value provided by the request. The setting value can be changed to a requested setting value for all of the selected devices, or alternatively the change can be suggested and implemented when the suggestion is accepted.

In one scenario, the request can be to change a particular setting of an application used by the networked devices 102. Non-limiting examples of settings include an avatar, a name of an entity, or a load profile. The similar devices can be all networked devices 102 that have a particular manufacturer, model, or are assigned to a particular group. The selected devices can be networked devices 102 for which the application setting is set to an expected value at the time the request is received, wherein the setting value can be the same setting value for which the networked device 102 (A1) that received the request is configured or a value provided by the request. The setting value can be changed to a requested setting value for all of the selected devices, or alternatively the change can be suggested and implemented when the suggestion is accepted.

Figure 3:
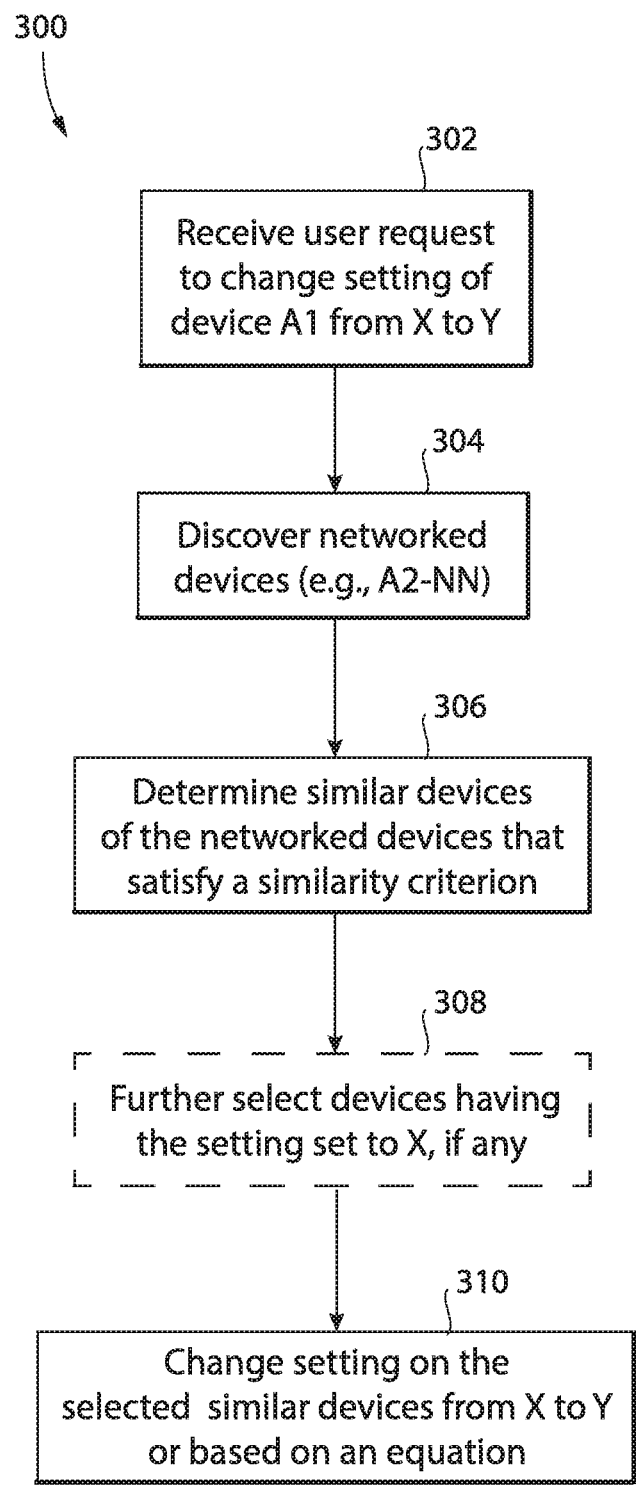
FIG. 3 is a flowchart of an example method of managing propagation of a setting change amongst a plurality of networked devices, in accordance with embodiments of the disclosure.

FIG. 3 shows an exemplary and non-limiting flowchart 300 illustrating a method for automatically adjusting a device setting of a plurality devices, in accordance with certain illustrated embodiments. The method can be performed by a networked device, such as any of networked devices 102 shown in FIG. 1. Before turning to the description of FIG. 3, it is noted that the flowchart 300 in FIG. 3 shows examples in which operational blocks are carried out in a particular order, as indicated by the lines connecting the blocks, but the various blocks shown in this flowchart can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

With reference to FIG. 3, a flow diagram 300 of an example application of a gap parameter estimation calculation method is shown. At block 302, a request is received by a networked device A1, wherein the request specifies a change of a setting of device settings of networked device A1 to a new value Y.

At block 304, networked device A1 discovers other devices with which it is networked (e.g., networked devices (A2)-(NN), as shown in FIG. 1). At block 306, networked device A1 determines similar devices of the discovered networked devices that, wherein the similar devices are selecting based on whether they satisfy a similarity criterion. At block 308, in accordance with one or more embodiments, networked device A1 further selects devices of the similar devices for which the value of the setting of the device settings that is requested to be changed set to an expected value. Block 308 is provided with dotted lines to indicate that block 308 may be performed in one or more embodiments, but may not be performed in one or more other embodiments. At block 310, the setting of the similar devices (or the selected devices, if a selection is made at block 308) is set to the new value Y, or to a value determined by an equation that is a function of the new value Y.

With reference to FIG. 4, a block diagram of an example computing system 400 is shown, which provides an example configuration of the networked devices 102. Additionally, all or portions of the networked devices 102 could be configured as software, and computing system 400 could represent such portions. Computing system 400 is only one example of a suitable system and is not intended to suggest any limitation as to the scope of use or functionality of embodiments of the disclosure described herein. Computing system 400 can be implemented using hardware, software, and/or firmware. Regardless, computing system 400 is capable of being implemented and/or performing functionality as set forth in the disclosure.

Computing system 400 is shown in the form of a general-purpose computing device. Computing system 400 includes a processing device 402, memory 404, an input/output (I/O) interface (I/F) 406 that can communicate with an internal component, such as a user interface 410, and optionally an external component 408.

The processing device 402 can include, for example, a PLOD, microprocessor, DSP, a microcontroller, an FPGA, an ASCI, and/or other discrete or integrated logic circuitry having similar processing capabilities.

The processing device 402 and the memory 404 can be included in components provided in the FPGA, ASCI, microcontroller, or microprocessor, for example. Memory 404 can include, for example, volatile and non-volatile memory for storing data temporarily or long term, and for storing programmable instructions executable by the processing device 402. Memory 404 can be a removable (e.g., portable) memory for storage of program instructions. I/O I/F 406 can include an interface and/or conductors to couple to the one or more internal components 410 and/or external components 408.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the networked devices 102 may be implemented or executed by one or more computer systems, such as a microprocessor. Each computer system 400 can be included within networked devices 102, or multiple instances thereof. In the example shown, computer system is embedded in networked device 102 (A1), and could likewise be embedded in networked devices 102 (A2)-(NN). In various embodiments, computer system 400 may include one or more of a microprocessor, an FPGA, application specific integrated circuit (ASCI), microcontroller. The computer system 400 can be provided as an embedded device. Portions of the computer system 400 can be provided externally, such by way of a centralized computer, a data concentrator, a cockpit computing device controls display of gap status, e.g., notifications about the gap or alerts, or the like.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A computer-implemented method to automatically adjust a device setting, the method comprising:
   receiving, at a requested device of a plurality of networked devices, wherein the plurality of networked devices are embedded industrial control devices in an industrial setting, a request to update the device setting of the requested device to a new value;
   responsive to receiving the request, updating, autonomously by the requested device, the device setting of the requested device to the new value;
   sending, autonomously by the requested device, to other networked devices of the plurality of networked devices, a query for a characteristic of the other networked devices;
   receiving the characteristic of the other networked devices from the other networked devices;
   comparing, autonomously by the requested device, the characteristic of the other networked devices to a corresponding characteristic of the requested device;
   determining, autonomously by the requested device, one or more similar devices of the other networked devices that satisfy a similarity criteria contingent upon the characteristic of the other networked devices being similar to the corresponding characteristic of the requested device based on a result of the comparison; and
   accessing, autonomously by the requested device, the one or more similar devices to change a corresponding device setting of the one or more similar devices to the new value, including the requested device logging onto a web server included in firmware of the one or more similar devices for changing the device settings via the web server.

2. The computer-implemented method of claim 1, further comprising selecting, autonomously by the requested device, at least one device of the one or more similar devices that has its corresponding device setting set to an expected value, the expected value being configured to be used for operation of the at least one device, wherein the requested device autonomously changes the corresponding device setting of only the at least one selected device.

3. The computer-implemented method of claim 2, wherein updating, autonomously by the requested device, the device setting of the requested device to the new value includes updating the device setting of the requested device from an original value to the new value, and wherein the expected value is the original value.

4. The computer-implemented method of claim 1, wherein the accessing autonomously by the device each of the one or more similar devices includes at least one of one-way authentication of the requested device by the one or more similar devices or two-way authentication between the requested device and the one or more similar devices.

5. The computer-implemented method of claim 1, wherein the characteristic is represented in a field stored by the plurality of networked devices, and wherein each device of the plurality of networked devices is configured with a capability of functioning as the requested device.

6. The computer-implemented method of claim 1, wherein comparing autonomously by the requested device includes determining a probability of similarity between the characteristic of the other networked devices and the corresponding characteristic of the requested device.

7. The computer-implemented method of claim 6, further comprising storing, by the requested device, a similarity matrix that includes a probability of similarity score for at least a portion of the respective other networked devices and determines the probability of similarity from the similarity matrix.

8. The computer-implemented method of claim 1, wherein the requested device communicates with the other networked devices using secure webpages.

9. The computer-implemented method of claim 1, wherein the new value is different for respective devices of the one or more similar devices.

10. The computer-implemented method of claim 1, wherein the new value varies for respective devices of the one or more similar devices in accordance with a predetermined mathematical equation.

11. A device included in a plurality of networked devices, comprising:
    a memory configured to store a plurality of programmable instructions; and
    at least one processing device in communication with the memory, wherein the at least one processing device, upon execution of the plurality of programmable instructions is configured to:
    receive a request to update a device setting of the device to a new value, wherein the plurality of networked devices are embedded industrial control devices;
    responsive to receiving the request, autonomously update the device setting of the device to the new value;
    send autonomously by the device, to other networked devices of the plurality of networked devices, a query for a characteristic of the other networked devices;
    receive the characteristic of the other networked devices from the other networked devices;
    autonomously compare by the device a characteristic of other networked devices of the plurality of networked devices to a corresponding characteristic of the device;
    autonomously determine by the device one or more similar devices of the other networked devices that satisfy a similarity criteria based on a result of the comparison; and
    access, autonomously by the device, the one or more similar devices to change a corresponding device setting of the one or more similar devices to the new value, including logging onto a web server included in firmware of the one or more similar devices for changing the device settings via the web server.

12. The device of claim 11, wherein the processor, upon execution of the plurality of programmable instructions is further configured to select, autonomously by the device, at least one device of the one or more similar devices that has its corresponding device setting set to an expected value, the expected value being configured to be used for operation of the at least one device, wherein the device autonomously changes the corresponding device setting of only the at least one selected device.

13. The device of claim 11, wherein autonomously comparing the characteristic includes determining a probability of similarity between the characteristic of the plurality of networked devices and the corresponding characteristic of the device.

14. The device of claim 13, wherein the device stores a similarity matrix that includes a probability of similarity score for at least a portion of the respective plurality of networked devices and determines the probability of similarity from the similarity matrix.

15. The device of claim 11, wherein the new value is different for respective devices of the at least one selected device.

16. A non-transitory computer readable storage medium having one or more computer programs embedded therein, which when executed by a computer system of a device of a plurality of networked devices, cause the computer system to:

receive a request to update a device setting of the device to a new value, wherein the plurality of networked devices are embedded industrial control devices;

responsive to receiving the request, autonomously update the device setting of the device to the new value;

send autonomously by the device, to other networked devices of the plurality of networked devices, a query for a characteristic of the other networked devices;

receive the characteristic of the other networked devices from the other networked devices;

autonomously compare by the device a characteristic of other networked devices of the plurality of networked devices to a corresponding characteristic of the device;

autonomously determine by the device one or more similar devices of the other networked devices that satisfy a similarity criteria based on a result of the comparison; and autonomously access by the device the one or more similar devices to change a corresponding device setting of the one or more similar devices to the new value, including logging onto a web server included in firmware of the one or more similar devices for changing the device settings via the web server.

17. The non-transitory computer readable storage medium of claim 16, wherein the instructions, when executed by a computer system, further cause the computer system to autonomously select at least one device of the one or more similar devices that has its corresponding device setting set to an expected value, the expected value being configured to be used for operation of the at least one device, wherein the device autonomously changes the corresponding device setting of only the at least one selected device.

* * * * *